(12) United States Patent
Nocchi et al.

(10) Patent No.: US 9,332,226 B2
(45) Date of Patent: May 3, 2016

(54) VIDEO SESSION MANAGER AND METHOD FOR ENABLING A VIDEO COMMUNICATION SESSION ACROSS GEOGRAPHICALLY DISPARATE DOMAINS

(71) Applicant: Tata Communications (America) Inc., Herndon, VA (US)

(72) Inventors: Joseph W. Nocchi, Manasquan, NJ (US); Neil Mitchell Swartz, Edison, NJ (US); John J. Franey, Howell, NJ (US)

(73) Assignee: Tata Communications (America) Inc., Herndon, VA (US)

(*) Notice: Subject to any disclaimer, the term of this patent is extended or adjusted under 35 U.S.C. 154(b) by 0 days.

(21) Appl. No.: 14/507,278

(22) Filed: Oct. 6, 2014

(65) Prior Publication Data
US 2016/0080695 A1 Mar. 17, 2016

Related U.S. Application Data

(60) Provisional application No. 62/050,558, filed on Sep. 15, 2014.

(51) Int. Cl.
*H04N 7/14* (2006.01)
*H04N 7/15* (2006.01)
*H04L 12/18* (2006.01)
*H04W 4/02* (2009.01)

(52) U.S. Cl.
CPC ............ *H04N 7/155* (2013.01); *H04L 12/1818* (2013.01); *H04W 4/02* (2013.01)

(58) Field of Classification Search
CPC .. H04L 12/1818; H04L 69/40; H04L 65/4038
USPC ...................................................... 348/14.04
See application file for complete search history.

(56) References Cited

U.S. PATENT DOCUMENTS

| 8,112,513 | B2* | 2/2012 | Margulis | ................. | G06F 3/14 709/224 |
| 2013/0021432 | A1* | 1/2013 | Kalipatnapu | ....... | H04L 12/1822 348/14.09 |
| 2015/0147996 | A1* | 5/2015 | Hobby | .................... | H04W 4/22 455/404.1 |
| 2015/0156457 | A1* | 6/2015 | Wamorkar | .............. | G06F 11/20 348/14.08 |

* cited by examiner

*Primary Examiner* — Creighton Smith
(74) *Attorney, Agent, or Firm* — Kaplan Breyer Schwarz & Ottesen, LLP

(57) ABSTRACT

A video session manager and method for enabling, optimizing, and managing inter-domain video communication sessions, including telepresence and videoconferencing sessions. The video session manager is configured to receive and analyze a video communication session request from one or more endpoints; to determine the viability of a communication session based on one or more attributes of the session; and to connect the one or more requesting endpoints to start the session. The video session manager is further configured to connect the one or more requesting endpoints via a bridging resource, such as a multipoint control unit, based on one or more considerations such as geography and transmission channel utilization.

16 Claims, 6 Drawing Sheets

VIDEO SESSION MANAGER AND METHOD FOR ENABLING A VIDEO COMMUNICATION SESSION ACROSS GEOGRAPHICALLY DISPARATE DOMAINS

FIELD OF THE INVENTION

The present invention relates to telecommunications in general, and, more particularly, to enabling, optimizing and managing video communication sessions across geographically disparate domains.

BACKGROUND OF THE INVENTION

Enterprise video conferencing is becoming a preferred way to conduct both one-on-one and group meetings. It enables employees to participate in a more relaxed and comfortable setting, whether they are working in the office or from home. Good enterprise video communication systems, such as telepresence systems and video conferencing systems (e.g., desktop video applications, etc.), can reduce travel expenditures and greatly increase productivity. This is, in part, because video feeds enable participants to interact in real time.

Video conferencing can take place within or across one or more domains. A domain may be a single organization, a closed user group, a company, or a community with logical (administration, policy, or management) and/or physical (network or security device) separation from the rest of the world. A single domain may include one or more zones with logical and/or physical demarcations. Examples of a single domain include, without limitation, an enterprise network with some local-area network endpoints, some Internet-connected endpoints and some mobile endpoints, or an enterprise network with endpoints within a single network that use different technology or protocols. Examples of different technology or protocols may include different types of signaling, such as SIP (Session Initiation Protocol), H.323, WebRTC (Web Real Time Communication), and TIP (Telepresence Interoperability Protocol), and different types of media codecs, such as H.264, H.265 and VP8.

When a communication session that includes video conferencing or telepresence is desired across multiple domains, or across zones within a domain, a series of problems arise that often prevent the communication session from being successfully executed, or even attempted. These problems create a perception that the communication session will not work or will be too difficult to achieve or costly, a perception that is often correct and, even when not, prevents the session from being attempted.

One category of problems that may arise relates to resource problems. Resource problems may include inadequate bandwidth, computing, bridging, or other resources for video sessions. These problems can occur because some prior-art systems do not optimize the use of such resources between different domains, and many of these resources are scarce, expensive, or shared.

Due to these and other limitations of at least some prior-art systems, inter-domain communication sessions that include videoconferencing or telepresence, usually fail for one or more of the following reasons:
 i. users assume that their inter-domain communication session cannot include video conferencing or telepresence endpoints outside of their domains so they do not attempt it;
 ii. users want to attempt an inter-domain communication session but do not know how to initialize and start the session (e.g., how to call the other parties, how to secure a bridge for multiple other parties, etc.); and
 iii. users attempt an inter-domain communication session but the capabilities are too low, the costs are too high, or the user experience is too cumbersome and time consuming.

Consequently, communication sessions that include inter-domain video are typically a very small percentage of today's enterprise video sessions. Similar problems are found inside large domains with multiple zones.

Accordingly, what is needed is an improved technique for executing and managing inter-domain communication sessions that include videoconferencing or telepresence, which makes it feasible for such sessions to be attempted and which makes attempted sessions successful, without at least some of the disadvantages in the prior art.

SUMMARY OF THE DISCLOSURE

A video session manager and method are disclosed for enabling, optimizing, and managing inter-domain video communication sessions, including telepresence and videoconferencing sessions. The video session manager is configured to receive and analyze a communication session request from one or more endpoints; to determine the viability of a communication session based on one or more attributes of the session; and to connect the one or more requesting endpoints to start the session. The video session manager is further configured to connect the one or more requesting endpoints via a bridging resource, such as a multipoint control unit, based on one or more considerations. For example and without limitation, one such consideration might be where one or more bridging resources are situated in relation to one or more communications endpoints across geographically disparate domains, such as enterprise networks in different parts of the world. Another consideration might be the utilization of one or more transmission channels between domains and the respective point-of-presence (POP) subnetworks providing access to services for the domains.

An illustrative method comprises: receiving, by a server computer, requests from at least two communication endpoints to start a video communication session in which multiple communication endpoints are to participate; evaluating, by the server computer, a plurality of bridging resources during initialization of the session, to select a bridging resource in the plurality for use in the video communication session, based on the geographic locations of the bridging resources with respect to the geographic locations of at least one of the communication endpoints from which the requests have been received thus far during the initialization; and connecting, by the server computer, the at least two communication endpoints via a selected bridging resource in the plurality.

An illustrative video session manager comprises: a receiver configured to receive requests from at least two communication endpoints to start a video communication session in which multiple communication endpoints are to participate; a processor configured to evaluate a plurality of bridging resources during initialization of the session, to select a bridging resource in the plurality for use in the video communication session, based on the geographic locations of the bridging resources with respect to the geographic locations of at least one of the communication endpoints from which the requests have been received thus far during the initialization; and a transmitter configured to transmit signals for connecting the at least two communication endpoints via a selected bridging resource in the plurality.

Another illustrative method comprises: receiving, by a server computer, requests from at least two communication endpoints to start a video communication session in which multiple communication endpoints are to participate; evaluating, by the server computer, a plurality of bridging resources during initialization of the session, to select a bridging resource in the plurality for use in the video communication session, based on the geographic locations of the bridging resources; and connecting, by the server computer, the at least two communication endpoints via a selected bridging resource in the plurality, wherein the selected bridging resource used for the connecting is the last bridging resource selected during the initialization, and wherein at least one other bridging resource had been previously selected during the initialization, for use in the video communication session.

DETAILED DESCRIPTION

Figure 1:
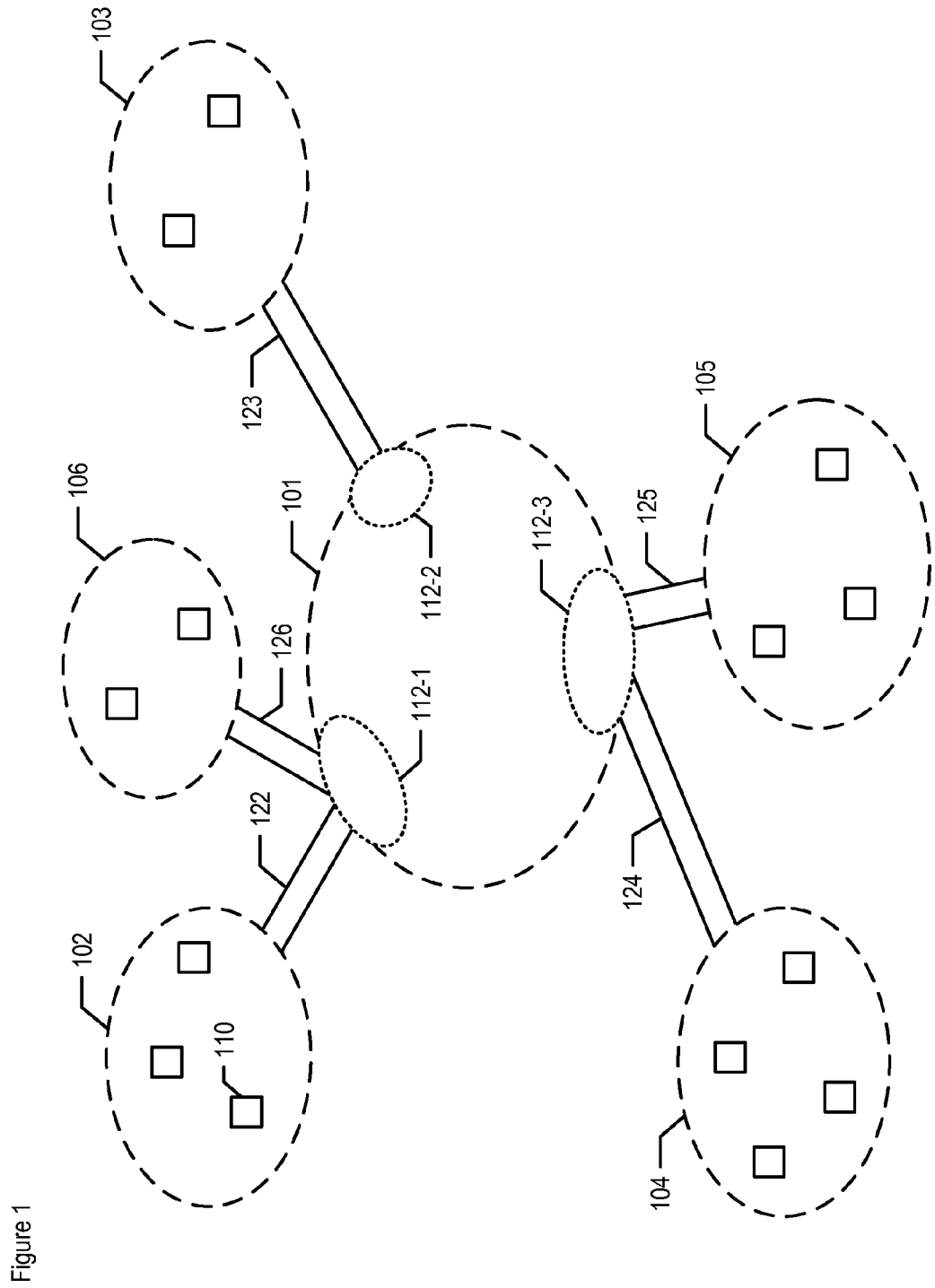
FIG. 1 depicts a schematic diagram of telecommunications system 100.

FIG. 1 depicts a schematic diagram of telecommunications system 100, in accordance with an illustrative embodiment of the present disclosure. System 100 comprises service provider network 101, enterprise networks 102 through 105, and Internet network 106, interconnected as shown. Associated with service provider network 101 are point-of-presence (POP) subnetworks 112-1 through 112-3, each of which comprises geographically-dependent equipment, as discussed below.

Service provider network 101 is a telecommunications backbone network. Network 101 is managed by one or more service providers, and provides bandwidth for various services and network access to endpoints in one or more enterprise networks 102 through 105. One of the services provided by network 101 is videoconferencing. Additionally, network 101 provides bandwidth and network access to endpoints in Internet network 106, as well as providing access to Internet network 106 for the other endpoints. Service provider network 101 is described below and in FIG. 2.

Each enterprise network 102 through 105 is a local telecommunications network. Each enterprise network is associated with a business organization and provides interconnectivity to its various company sites in order to share telecommunications resources, including communications and computing resources. Each enterprise network comprises one or more communication endpoints, as described below, and provides interconnectivity between each endpoint and the transmission channel used by the endpoint, as described below. Although there are four enterprise networks depicted as part of telecommunications system 100, there can be a different number of such networks present, as those who are skilled in the art will appreciate after reading this specification.

Communication endpoint 110 is representative of a communication endpoint, or just "endpoint", within an enterprise network. As a node or terminal, each endpoint provides access to one or more telecommunications services, such as videoconferencing, for one or more people or machines, or both. Although endpoint 110 is one of three endpoints depicted within enterprise network 102, there can be a different number of such endpoints present within an enterprise network, and there can be a different number of endpoints present from one enterprise network to the next, as those who are skilled in the art will appreciate after reading this specification.

Internet network 106 is a system of interconnected computer networks that use the standard Internet protocol suite, in well-known fashion. Network 106 can be used directly by one or more endpoints to access telecommunications services, such as videoconferencing, provided by service provider network 101. By accessing such services, endpoints within network 106 can communicate with endpoints within one or more of the enterprise networks, for example and without limitation. Although there is a single Internet network depicted as part of telecommunications system 100, there can be a different number of such networks present, which can be public and/or private, as those who are skilled in the art will appreciate after reading this specification.

Each of POP subnetworks 112-1 through 112-3 is an interface point between communication endpoints with its geographically proximate enterprise or Internet network and communicating entities elsewhere in system 100. As depicted, POP subnetwork 112-1, 112-2, and 112-3 is geographically proximate to enterprise network 102, network 103, and networks 104 and 105, respectively. Each POP subnetwork comprises one or more multipoint control units (MCU), described in detail below, providing access to telecommunications services, including videoconferencing, to its corresponding enterprise network.

In particular, POP 112-1 provides access to telecommunications services (e.g., video or other communications as enabled by network 101, etc.) for enterprise network 102 and Internet network 106 via transmission channels 122 and 126, respectively. POP 112-2 provides access to telecommunications services for enterprise network 103 via transmission channel 123. And POP 112-3 provides access to telecommunications services for enterprise networks 104 and 105 via transmission channels 124 and 125, respectively. Each transmission channel terminates into its corresponding POP subnetwork via a session border controller (SBC), as is known in the art.

The depicted POPs are geographically disparate from one another. At least between some of the POPs, this geographic distinction is to such an extent that an allocation of one or more resources (e.g., a multipoint control unit, etc.) from a first POP can have a different effect on quality-of-service or cost, or both, than an allocation from a second POP. For pedagogical purposes, POP 112-1 is situated in the New York City Area, POP 112-2 is situated in the London area, and POP 112-3 is situated in the Singapore area. As those who are skilled in the art will appreciate, after reading this specification, the points-of-presence can be situated in different geographic areas than those in the foregoing example.

Although there are three point-of-presence subnetworks depicted as part of system 100, there can be a different number of such networks present, as those who are skilled in the art will appreciate after reading this specification. Furthermore, each point-of-presence subnetwork can also provide access to a different number of enterprise and/or Internet networks than depicted, as those who are skilled in the art will appreciate after reading this specification.

Figure 2:
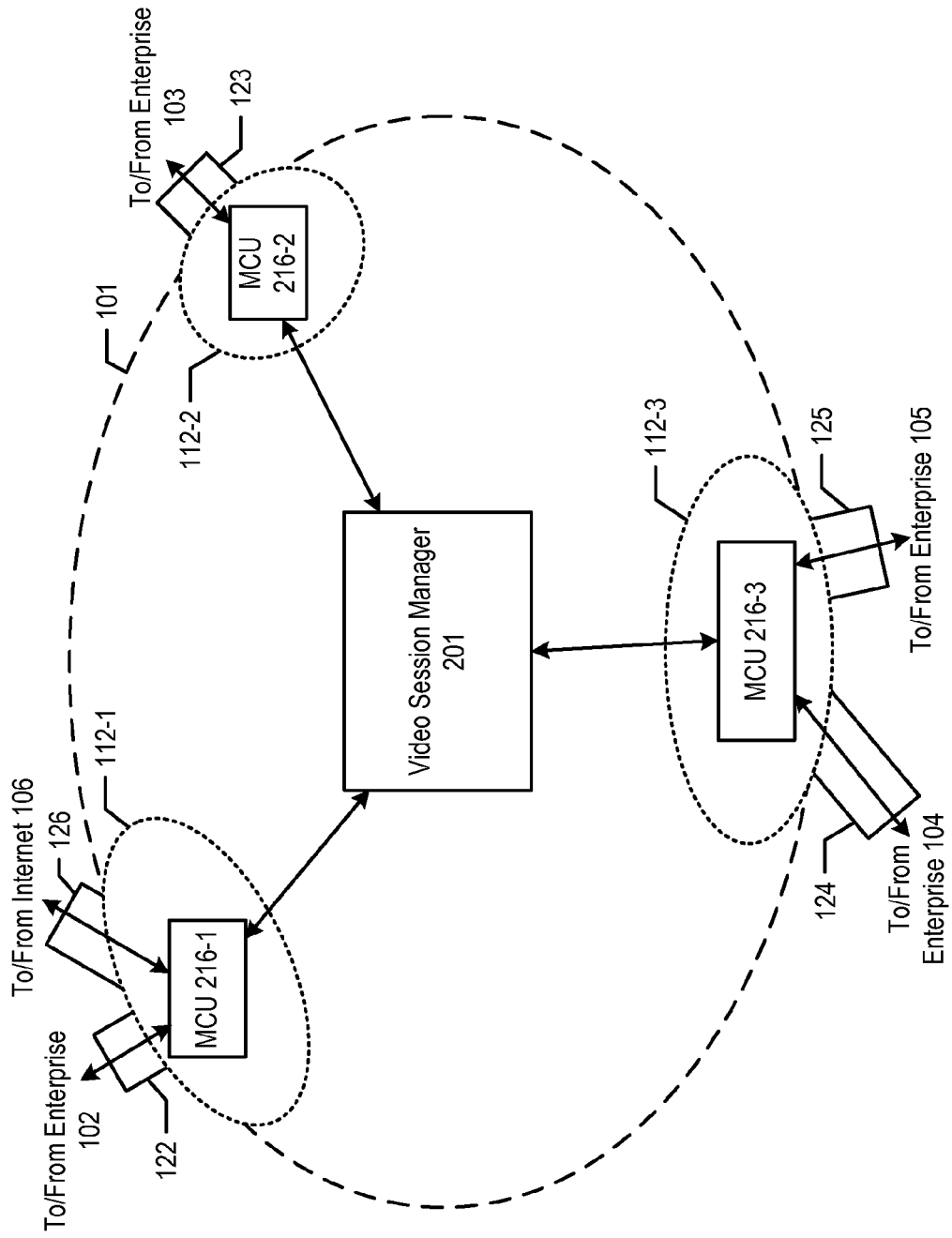
FIG. 2 depicts a schematic diagram service provider network 101, within system 100.

FIG. 2 depicts a schematic diagram service provider network 101 in accordance with an illustrative embodiment of the present disclosure. Service provider network 101 comprises video session manager 201 and multipoint control units 216-1 through 216-N, interconnected as shown, wherein N is a positive integer.

Video session manager (VSM) 201 manages communication sessions among one or more domains and/or among one or more zones in a domain. Each enterprise network (e.g., enterprise network 102, etc.) is a non-limiting example of a domain as referred to in this context. VSM 201 enables the domains and/or zones to interact with one another in one or more communication sessions. VSM 201 enables inter-domain and/or inter-zone video and telepresence communication sessions among the domains and/or zones, respectively. When interfaced with VSM 201, each domain and/or zone can continue to employ and operate its own methods and technology. In some embodiments, VSM 201 can include session management, resource management, policy, and routing components, for a variety of different communication sessions including, but not limited to, audio and/or video based communication sessions, and applications such as web conferencing and any third party software that wishes to incorporate video or voice.

VSM 201 as depicted in FIG. 2 is part of server provider network 101. However, VSM 201 can physically and/or logically be part of an enterprise network domain or in a different, neutral third party domain than network 101, as those who are skilled in the art will appreciate after reading this disclosure. VSM 201 is described in further detail below and in FIG. 3.

Multipoint control unit (MCU) 216-n, wherein n can have a value of between 1 through N, is a data-processing system configured to bridge videoconferencing connections. The multipoint control unit is a node in the network that provides the capability for multiple endpoints to participate in a multipoint conference via bridging those endpoints. Although a single MCU is depicted as being associated with each POP subnetwork, multiple MCUs can operate within each POP subnetwork, as those who are skilled in the art will appreciate after reading this specification.

Each MCU 216-n is situated within a corresponding POP subnetwork. A given POP subnetwork is situated geographically closer to its corresponding enterprise network than to other enterprise networks. Therefore, the MCU or MCUs that are situated within a given POP subnetwork are also geographically closer to their corresponding enterprise network than to other enterprise networks. This geographic closeness, or proximity, to the respective enterprise network is important for various reasons, including reasons that related to quality of service (QoS) and cost. For example, if multiple endpoints are to be part of a given videoconference and only one of the endpoints is within enterprise network 103, then it might not make sense, from a QoS and/or cost perspective, for MCU 216-2 (i.e., within POP subnetwork 112-2 that corresponds to network 103) to be bridging the videoconference. It is an important consideration to have MCUs that are geographically proximate to their respective enterprise networks, at least relatively speaking, and to manage one or more videoconferencing-related transactions accordingly.

As those who are skilled in the art will appreciate after reading this specification, one or more of MCU 216-n can be bridges, proxy servers, gateways, and any combination and number of media data-processing systems thereof.

In some embodiments of the present disclosure, service provider network 201 can further comprise one or more service provider routers, one or more load balancers, and/or one or more signaling servers, as are all known in the art. One or more of these components can scale in number and can be in different physical locations.

In some embodiments of the present disclosure, the load balancers or MCUs 216-1 through 216-3, or both, can be components of VSM 201.

Figure 3:
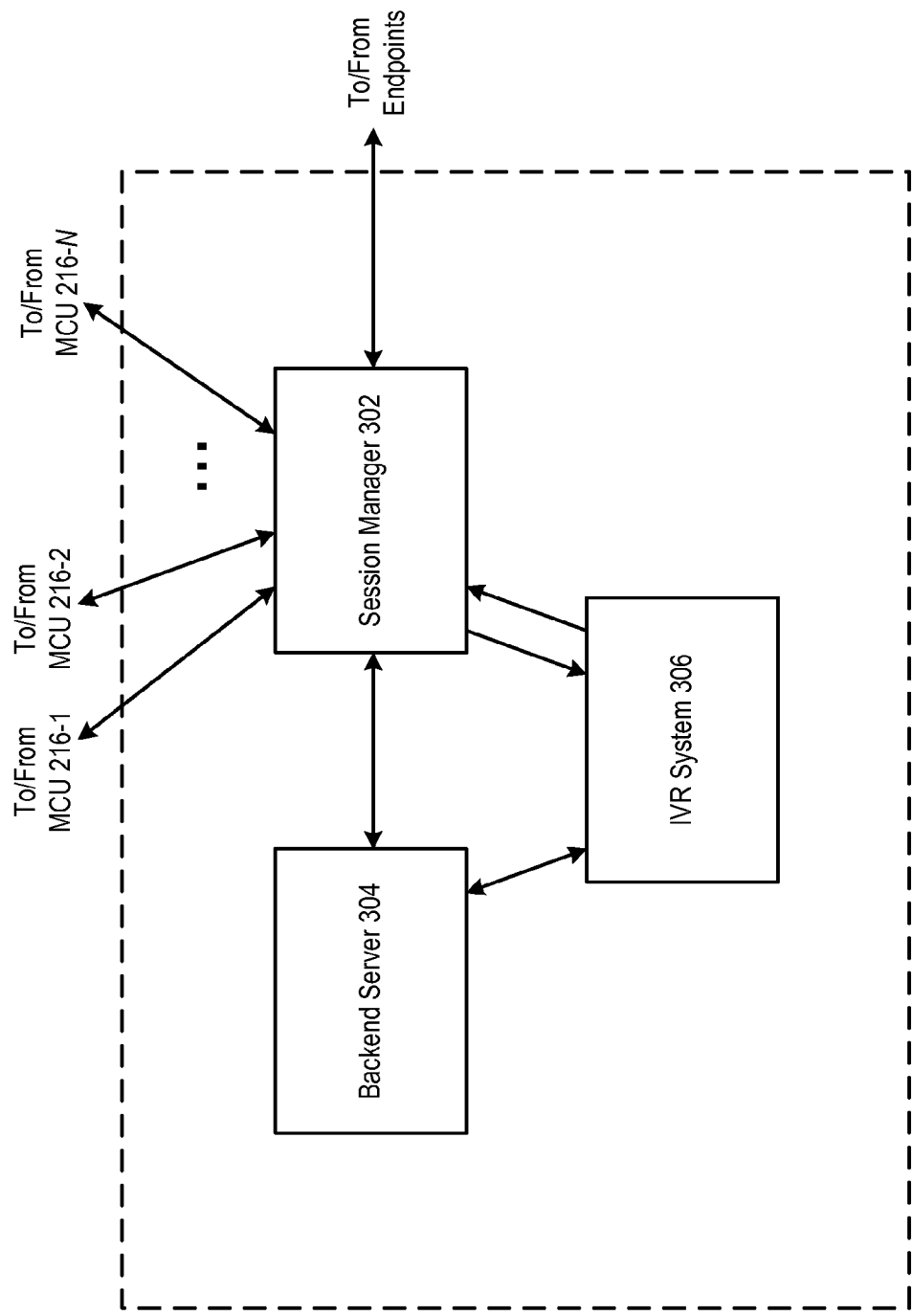
FIG. 3 is a schematic diagram of video session manager (VSM) 201, within network 101.

FIG. 3 is a schematic diagram of video session manager (VSM) 201, in accordance with an illustrative embodiment of the present disclosure. As described earlier, VSM 201 manages communication sessions among one or more domains and/or among one or more zones in a domain. VSM 201 can be implemented in hardware, software, or a combination of hardware and software. Software components of VSM 201 can reside in one or more server computers or like computing devices or machines. The server computers or like computing devices or machines may comprise one or more central processing units (processors) and one or more memory devices. The structure and function of such server computers and the like are well known to those skilled in the art.

VSM 201, in some embodiments, is configured to perform one or more of the following functions, in any combination:
 i. receive and analyze a communication session request (signaled by any telephony or web protocol) from one or more endpoints (users including, without limitation, software clients, hardware based endpoints, web clients running on mobile devices, and the like);
 ii. determine the viability of a communication session based on one or more attributes of the session;
 iii. connect the one or more requesting endpoints to start the session;
 iv. continuously or periodically monitor the session for problems with or changes in the session; and
 v. alter the parameters of the session in accordance with one or more predetermined policies, if a problem or change is detected, in order to maintain the viability of the session.

VSM 201, in other embodiments, can also be configured to originate one or more communication sessions.

As depicted in FIG. 3, VSM 201 comprises one or more session managers 302, one or more backend servers 304, and interactive voice response (IVR) system 306, interconnected as shown. Session manager 302, backend server 304, and IVR system 306 are configured to exchange data with one another. One or more of elements 302, 304, and 306 can be lumped together (e.g., as a single apparatus/data-processing system/server computer), as those who are skilled in the art will appreciate after reading this specification.

In accordance with an illustrative embodiment, session manager 302 provides the routing/switching logic to connect each endpoint either to IVR system 306 or an MCU. Backend server 304 executes at least some of the control logic described below and in FIGS. 4 through 6. IVR system 306 provides a waiting room capability (e.g., with music-on-hold, etc.) prior to a communication session actually starting. As those who are skilled in the art will appreciate, after reading this specification, a division of functionality that is different than the foregoing is possible within video session manager 201.

Collectively, the components depicted in FIG. 3 provide a data-processing apparatus whose hardware platform comprises:
 i. one or more processors configured to perform at least some of the operations described below;

ii. non-volatile memory configured to store a) an operating system, b) application software corresponding to the operations described below, and c) a database; and iii. a network interface comprising a receiver part configured to receive signals and a transmitter part configured to transmit signals.

Figure 4:
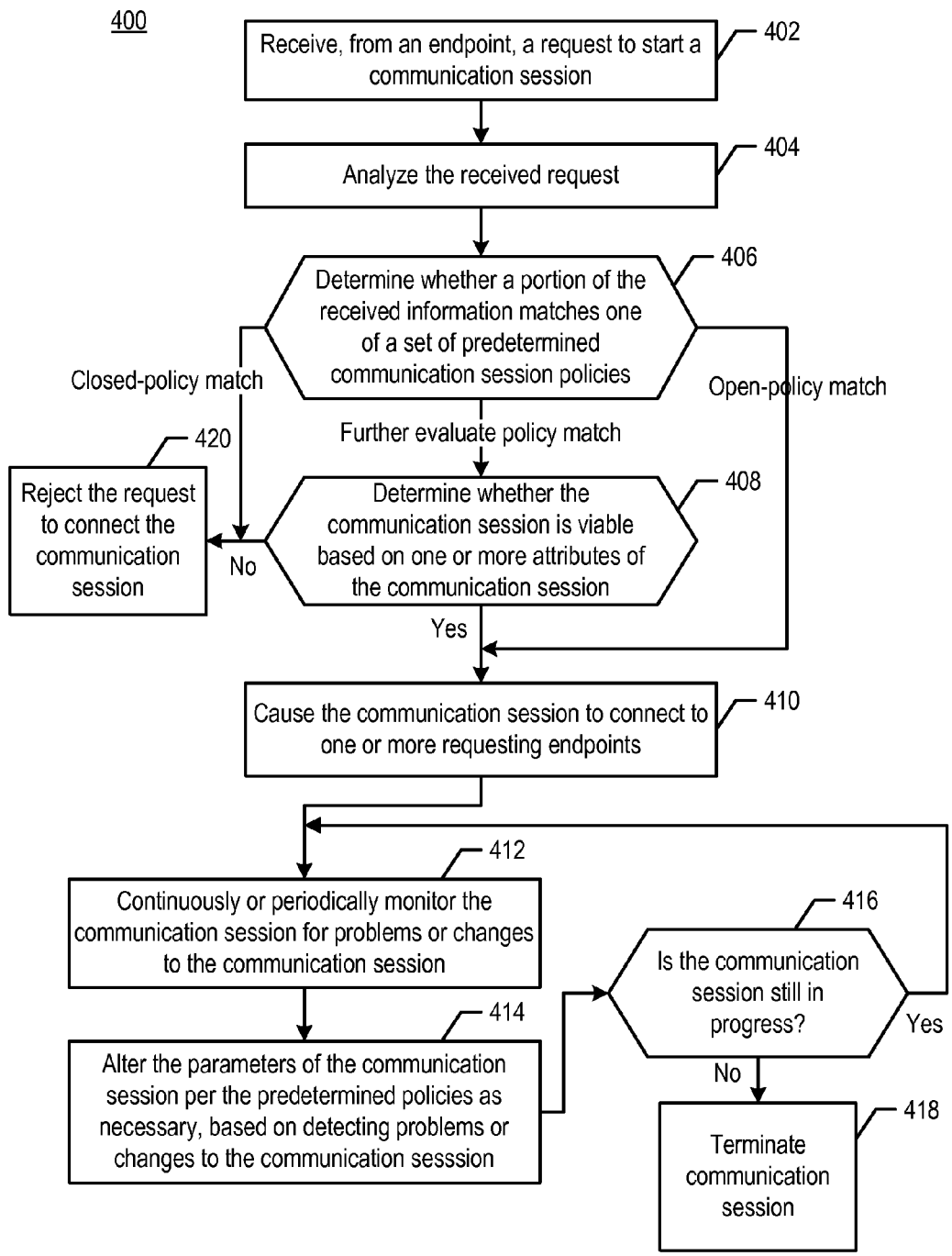
FIG. 4 depicts a first flowchart that represents at least some of the salient, operational logic of VSM 201.
Figure 5:
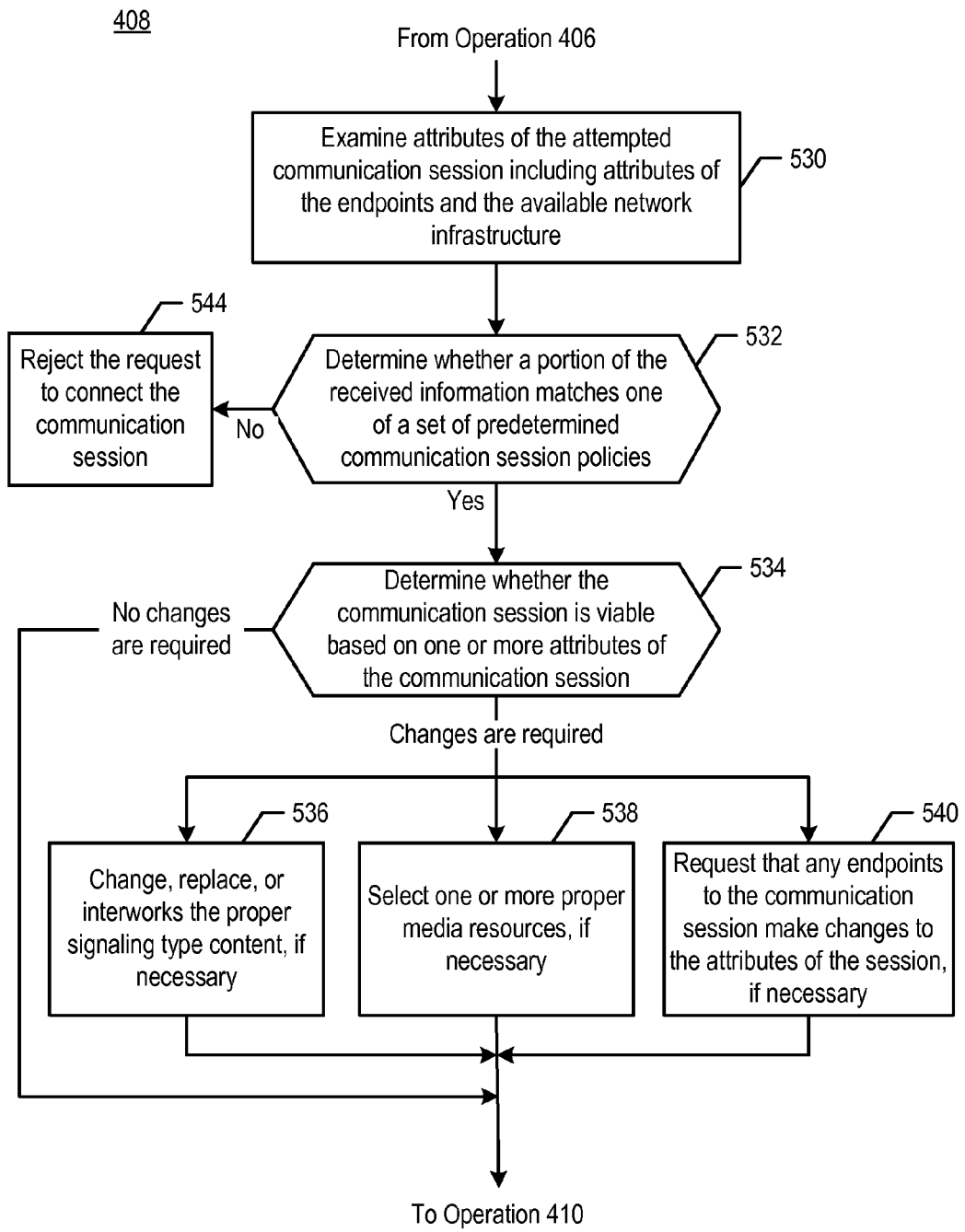
FIG. 5 is a flowchart depicting the salient, operational logic of VSM 201's session viability determination capability represented by operation 408 of FIG. 4.
Figure 6:
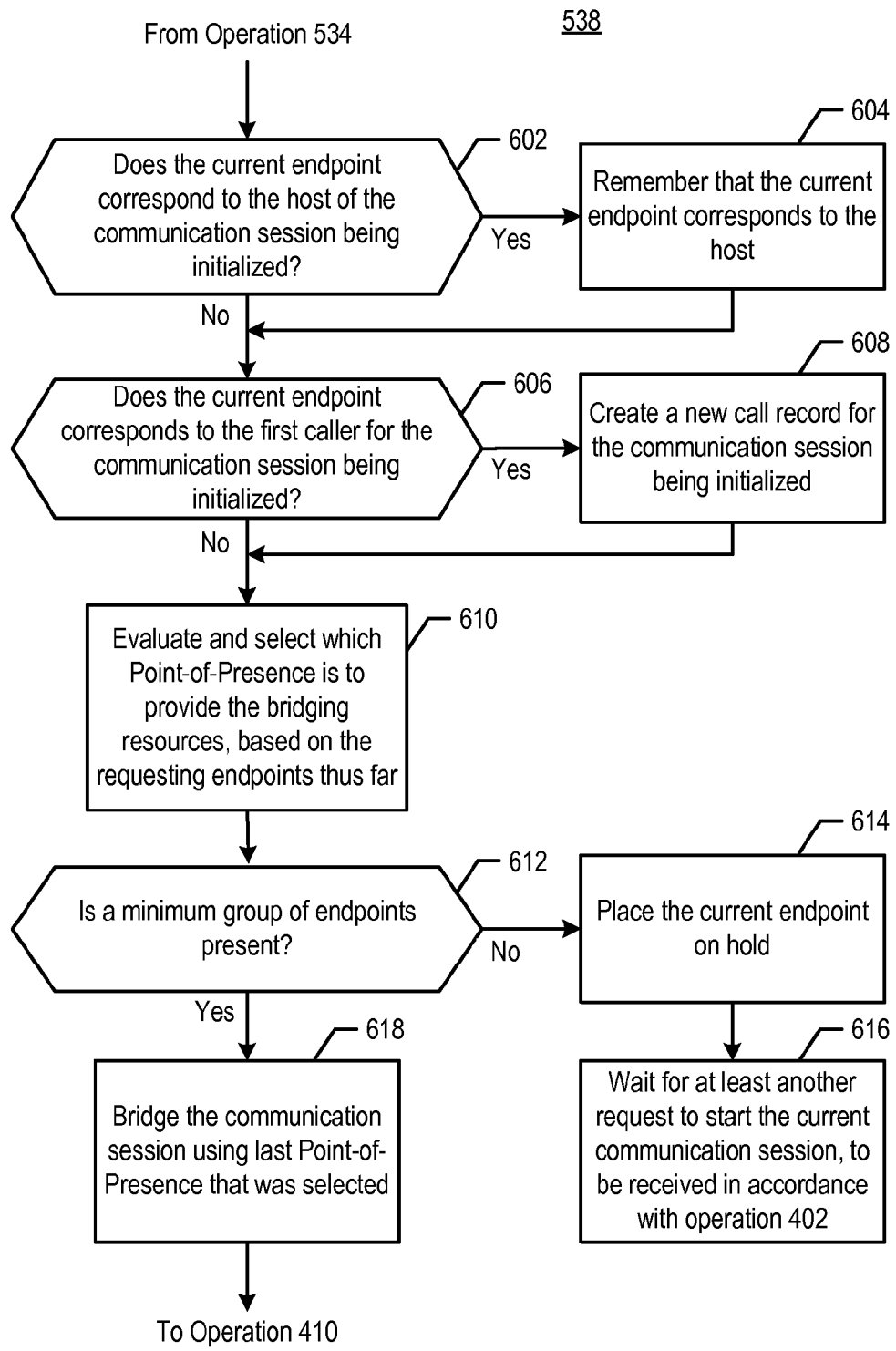
FIG. 6 is a flowchart depicting the salient, operational logic of VSM 201's media resource selection capability represented by operation 538 of FIG. 5.

FIGS. 4 through 6 depict flowcharts that represent at least some of the salient, operational logic of VSM 201, in accordance with an illustrative embodiment of the present disclosure, in which signaling and call control elements of a video communication session attempt have been triggered or requested via a communication session origination process. One or more of elements 302, 304, and 306 of VSM 201, in any combination, can perform the operations represented within each flowchart. For pedagogical purposes, however, the operations are described in this disclosure as being performed by VSM 201 as a whole. Although initialization and starting of a video communication session is featured, the techniques disclosed herein can be applied to any other type of communication session being initialized and started, as those who are skilled in the art will appreciate after reading this specification.

In regard to the methods represented by the flowcharts contained herein, it will be clear to those having ordinary skill in the art, after reading the present disclosure, how to make and use alternative embodiments of the disclosed methods wherein the recited operations, sub-operations, and messages are differently sequenced, grouped, or sub-divided—all within the scope of the present invention. It will be further clear to those skilled in the art, after reading the present disclosure, how to make and use alternative embodiments of the disclosed methods wherein some of the described operations, sub-operations, and messages are optional, are omitted, or are performed by other elements and/or systems.

FIG. 4 depicts a first flowchart that represents at least some of the salient, operational logic of VSM 201 as part of method 400. In accordance with operation 402, VSM 201 receives session attempt requests such as videoconferencing-related requests, for example and without limitation. If the session attempt has been originated from a communication endpoint in one of the domains, then that endpoint or the devices managing call control for that endpoint, or both, is configured to route the request to the VSM. The video session attempt signaling may include, without limitation, SIP or H.323.

After VSM 201 receives the session attempt requests, the VSM in accordance with operation 404 analyzes the requests to start the communication session.

In accordance with operation 406, VSM 201 performs a first-level session viability inspection, in which it assesses information provided in the requests and determines whether a portion of this information matches one of a set of predetermined communication session policies. If VSM 201 finds an "open" policy match, the logic flows to operation 410, in which session execution steps are triggered by the VSM to connect the one or more requesting endpoints. If VSM 201 finds a "closed" policy match, the logic flows to operation 420, in which the VSM rejects the request(s) to connect the communication session. Depending upon the nature of the endpoint that requested the session, and the policies that govern that endpoint, VSM 201 is configured to provide data, audio or video feedback as to why the session was rejected so that, for example, the user may be able to try again in a different manner.

In the first level session viability inspection according to operation 406, VSM 201 assesses information provided in the requests and determines whether a portion of this information matches one of a set of predetermined communication session policies. In this process, VSM 201 initially identifies signaling fields to determine the originating entity and requested destination, and correlate this information with the VSM's backend databases (which can be stored in memory and/or disk), in order to determine the administrative domain to which each request belongs. Identification can be based on any field or combinations of fields, including without limitation, name, type, IP address, MAC address, URI, unique ID, or domain membership, either alone or in any combination.

The policies for the involved domains and endpoints may then be analyzed and acted upon. Any policy can be defined in the VSM (e.g., defined in a policy engine component of the VSM) and all domains can control their own VSM, choosing their own policies and parameters. For example, global policy choices governing initial inspection can include the open, closed, and further-evaluate policies described herein. The open policy can include initially assuming that all calls between the domains (or within the single domain if both calls are in one domain), irrespective of endpoint type or the attributes requested in the call, are viable, therefore, the VSM may pass the session to the next step without doing further validation. The closed policy can include restricting all calls matching the involved domains, therefore, the VSM may reject the session immediately, at times with user feedback as previously described. The further-evaluate policy can include requiring further evaluation based on the specifics of the endpoints and other call attributes, therefore, VSM 201 may proceed to the next operation (i.e., operation 408) in the session viability process. The choice of the policy can be made using policy algorithms to be described further on.

If VSM 201 finds a "further evaluate" policy match in operation 406, the logic flows to operation 408, in which the VSM performs a second level session viability inspection. In the second level session viability inspection, VSM 201 determines whether the communication session is viable based on one or more attributes of the communication session. If VSM 201 determines that the session is not viable, the logic flows to operation 420, in which the VSM rejects the corresponding request(s) to connect the communication session. If VSM 201 determines the session is viable, the logic flows to operation 410, in which the VSM triggers session execution steps to connect the one or more requesting endpoints.

In the second level session viability inspection according to operation 408, which is described in further detail in FIG. 5, VSM 201 examines other attributes of the attempted session and the involved networks and infrastructures, and compares them to the policies in place, and determines how to proceed. Any attribute can be added to the VSM, with five groups of common attributes being defined in the VSM as follows, for example and without limitation:

i. signaling, media and management types, ports and protocols supported by each endpoint and intermediate devices such as bridges, MCUs and SBCs;

ii. the desired properties of the session including signaling encryption, media encryption, lawful intercept and collaboration types;

iii. the resource requirements of the session including bandwidth, transcoding, transrating, image size, compression, motion handling, frames per second and QoS, as well as the capabilities of the networks and infrastructure including network types, interfaces, protocols, bandwidth, ports, computers, QoS schemes, security and encryption mechanisms, network border element characteristics such as firewalls, session border controllers and application gateways;

iv. the policies needed for the session including usage, privacy, session launch types, topology hiding, identification, authentication and financial settlement; and v. the needs for integration with other services including voice, data, gaming, collaboration tools (e.g. digital white-boarding), recording, streaming, media and other third-party services and applications.

Based on attributes such as the foregoing, VSM 201 determines if the session is viable, in what manner, and what the VSM needs to do to enable the session. If it is not viable, then user feedback can be given via the methods described above. If it is viable, there are two possible VSM actions resulting from the inspection of those attributes:

i. the VSM will route the signaling to the destination indicated by the call signaling, staying in the call signaling for the duration of the session (e.g., by inserting a VSM SIP user agent in the session); or ii. the VSM can alter the session in order to make the session viable, optimized or processed according to policy.

In some alternative embodiments of the present disclosure, there is a different number and/or there are different types of session viability inspections than the two that are depicted in FIG. 4, as those who are skilled in the art will appreciate after reading this specification.

As described above and in accordance with operation 410, VSM 201 triggers session execution steps to connect the one or more requesting endpoints to one another. For example and without limitation, VSM 201 transmits signals that convey information to connect each endpoint to the selected multipoint control unit (MCU), or other type of bridging resource, for the purpose of starting the requested video communication session. How two or more endpoints are connected via an MCU, once the MCU itself has been selected, is well known to those skilled in the art.

After connection of the one or more requesting endpoints, the logic flows to operation 412, in which VSM 201 continuously or periodically monitors the communication session for problems with or changes to the session. If VSM 201 detects a problem with or a change in the session, the logic flows to operation 414, in which the VSM alters the parameters of the session in accordance with the predetermined policies, in order to maintain viability of the communication session, and then determines, in accordance with operation 416, whether the communication session is still in progress. If the session is still in progress, the logic returns to operation 412 in which VSM 201 continuously or periodically monitors the communication session for problems with, or changes to the session. If the session is not in progress, the logic flows to operation 418 in which VSM 201 ends the communication session.

FIG. 5 is a flowchart depicting the salient, operational logic of VSM 201's session viability determination capability represented by operation 408 of FIG. 4, in accordance with an illustrative embodiment of the present disclosure. In accordance with operation 530, VSM 201 examines attributes of the attempted communications including attributes of the endpoints and the available network infrastructure.

In accordance with operation 532, VSM 201 determines whether the communication session is potentially viable with or without changes. In accordance with operation 544, VSM 201 rejects the request if it determines in accordance with operation 532 that the communication session is not viable. In rejecting the request, the VSM may provide feedback to the rejected endpoints explaining the reason(s) for rejecting the communication session.

If VSM 201 determines in accordance with operation 532 that the communication session is viable, then the logic flows to operation 534, in which the VSM determines whether the communication session requires changes to one or more attributes thereof to be viable. If VSM 201 determines in accordance with operation 534 that no changes are required, the logic flows to operation 410 of FIG. 4, in which the VSM causes the communication session to connect to one or more requesting endpoints. If, however, VSM 201 determines in accordance with operation 534 that changes are required, the logic flows to one or more of operations 536, 538 and 540. If required, VSM 201 changes, replaces, or interworks the proper signaling type content in accordance with operation 536, selects one or more proper media resources (e.g., a particular multipoint control unit, etc.) in accordance with operation 538, and/or requests that any endpoints to the communication session make changes to the attributes of the communication session in accordance with operation 540. Operation 538 is described below and in FIG. 6. Once changes to the one or more attributes have been made, the logic flows to operation 410 of FIG. 4, in which VSM 201 causes the communication session to connect to one or more requesting endpoints.

FIG. 6 is a flowchart depicting the salient, operational logic of VSM 201's media resource evaluation and selection capability represented by operation 538 of FIG. 5, in accordance with an illustrative embodiment of the present disclosure. VSM 201, in accordance with operation 538, is configured to allocate the proper media resources from one or more pools of logical ports, for each request received by each different endpoint that is to participate in a communication session. For example, at least two or more available logical ports in one or more of multipoint control units 216-1 through 216-N can be grouped into a pool of logical ports that can be allocated on the fly to connect endpoints for a particular communication session handled by VSM 201. To this end, at least some of the operations depicted in FIG. 6 are executed for at least two endpoint participants in a given communication session being initialized during the initialization period leading up to the actual starting of the session.

Notably, each one of multiple passes through one or more of the operations depicted in FIG. 6 can result in a different set of bridging resources at a different POP being selected. For example, a first request to start a particular communication session (e.g., a particular videoconference, etc.) and received from a first communication endpoint might result in POP 112-1 (situated in New York City, as described earlier) being selected from which to use bridging resources, while a second request to start the communication session and received from a second endpoint might result in POP 112-2 (situated in London) being selected, and so forth. In some embodiments, such shifting from one POP to another is effective in ensuring that the best possible POP has available bridging resources when the communication session is actually started.

In accordance with operation 602, VSM 201 determines whether the current endpoint (i.e., the endpoint from which the current request has been received) corresponds to the host of the communication session being initialized. In some embodiments, the host is determined from the personal identification number (PIN) or equivalent being entered by the participant at the endpoint. If the current endpoint does correspond to the host, then this information is remembered in accordance with operation 604. In any event, the control logic then flows to operation 606.

In accordance with operation 606, VSM 201 determines whether the current endpoint corresponds to the first caller for the communication session being initialized. If so, then VSM 201 creates a new call record in accordance with operation 608. In any event, the control logic then flows to operation 610.

In accordance with operation 610, VSM 201 evaluates and selects which of POPs 112-1 through 112-N is to provide one or more bridging resources for the communication session, given the one or more communication session requests that have been received from one or more communication endpoints. In accordance with an illustrative embodiment of the present disclosure, VSM 201 evaluates and then attempts to select the "best" POP, including its bridging resources, for the current communication session being initialized. In considering the best POP, VSM 201 attempts to select the POP that will produce the best quality of service (QoS) for the session if it were to be used given the endpoints from which requests have been received thus far. Ideally, the best QoS would be achieved by selecting the POP that is geographically proximate to every endpoint to be bridged onto the session. However, because the endpoints to be bridged can be scattered across two or more geographically disparate regions served by two or more POPs, the selection of a POP can be based on one or more of the following, for example and without limitation:

i. where the majority of the endpoints are;
ii. where the greatest number of endpoints are;
iii. where the host endpoint is, in the event of a tie amongst the other endpoints;
iv. where the host endpoint is, unconditionally.

VSM 201 considers the geographic locations of the endpoints, among other scheduling inputs it considers, in order to determine where the endpoints are for the purpose of selecting the POP and its bridging resources. Notably, VSM 201 considers the endpoints' locations throughout the initialization period of the communication session (e.g., as each of multiple endpoints dial into a scheduled conference, etc.), re-evaluating which POP is the "best" POP as the scheduling inputs change, leading up to the actual starting of the session. In other words, VSM 201 continually evaluates multiple POPs, and their corresponding bridging resources, with respect to the geographic locations of at least one of the requesting endpoints, by performing an evaluation for each request received from an endpoint requesting that a given communication session be initialized and started, and selects the best POP thus far as the current candidate to serve the session. As a result, there are "evaluated" POPs that have been evaluated but might or might not have been selected, a "preliminarily-selected" POP or POPs that have been selected for possible use but might or might not end up being used in a started communication session, and a "finally-selected" POP that is actually used in the started communication session. The foregoing terminology applies to the corresponding bridging resources (e.g., MCUs, etc.) as well.

VSM 201 selects a POP for eventual bridging of the two or more endpoints of the current session being initialized, based on the aforementioned criteria, provided that the POP has a sufficient number of logical ports that can be allocated to handle the anticipated endpoints of the session. An allocating of logical ports can include, but is not limited to, allocating logical port capacity within one or more multipoint control units 216-1 through 216-N, or other equipment, in a particular location or even one or more devices within one or more different geographical locations. If there are not enough logical ports associated with the candidate POP, then the next best POP can be selected until either i) a new POP is selected (e.g., as a result of another evaluation occurring based on a new request arriving from another endpoint, etc.) or ii) the session is started.

VSM 201 can determine whether a sufficient number of logical ports can be allocated at a POP, in the following manner. VSM 201 can identify the quantity of logical ports that are permitted for a host to use in a communication session from information stored in association with the host, such as the number of logical ports that the host paid to use in a communication session, for example and without limitation. VSM 201 can compare the quantity of logical ports that are permitted for the host against a pool of available logical ports to determine if the quantity of logical ports that are permitted for the host are available to be assigned to the host from the pool. If the pool of available logical ports includes enough ports, VSM 201 will assign to the host, for use in the host's communication session, the quantity of logical ports from the pool that is equivalent to the quantity of logical ports that is permitted for the host. In an alternative embodiment, VSM 201 will assign the quantity of logical ports from the pool that is equivalent to the quantity of logical ports that the host actually needs for a communication session, up to the quantity of logical ports that are permitted for the host. For example, if the host paid for twelve ports for use in a communication session, but only requires three ports for a particular communication session, VSM 201 will allocate three ports rather than twelve ports.

VSM 201 can be configured to dynamically handle port contention or port congestion when a pool of logical ports does not have enough ports available for a communication session. This may occur, in some embodiments, where a host has paid for a premium service that guarantees that a certain number of ports will be available anytime that the host originates a communication session. In one such embodiment, where a host is entitled to a certain number of ports for a communication session and the ports are not available, VSM 201 can examine attributes of other active communication sessions to determine if logical ports that have been allocated to the other active communication sessions can be freed up and reallocated to the host. In some embodiments, VSM 201 can determine what logical ports have been allocated to another communication session, but are not being used for the communication session (e.g., if another host paid for twelve ports for use in a communication session, but is only using four ports for a particular communication session, VSM 201 can determine that the unused eight other logical ports can be placed back into the pool and reallocated to the host, or reallocated directly to the host).

VSM 201 can periodically examine allocated, but unused, logical ports in one or more active communication sessions for reallocation to a pool of logical ports independent of whether the pool of logical ports has run out of ports or whether the pool is below a threshold quantity of logical ports. For example, VSM 201 may reallocate unused logical ports to a pool after the logical ports remain unused in an active communication session for more than a predetermined period of time (e.g., a certain number of minutes such as 3, 5, 10, etc.).

In some embodiments, where a host is entitled to a certain number of ports for a communication session and the ports are not available, VSM 201 can examine attributes of the other hosts of active communication sessions to determine if one host has priority over another host for allocation of logical ports. In one such embodiment, if a host has paid for guaranteed allocation of a certain quantity of ports and the pool of logical ports does not have enough ports to satisfy this guarantee, VSM 201 can be configured to look for ports that are allocated to another host that did not pay for a guaranteed number of ports. If VSM 201 finds another host that did not pay for a guaranteed number of ports, VSM 201 can be configured to reallocate this other hosts ports (even if the ports are actually in use by the other host) to the pool of logical ports or reallocate the other host's ports to the host that paid for the guaranteed allocation of a certain quantity of ports.

In some embodiments, VSM 201 can be configured to provide an indication to the other host (and/or its participants) that the other host will lose one or more ports as part of a port reallocation. The indication to the other host about the port reallocation can be though a video message, audio message, and/or text in ticker scroll that VSM 201 can provide to the other host (and/or its participants). In this manner, the host and its participants will know that there is not a technical problem with the communication session if one or more endpoints are removed from the communication session. It should be appreciated that VSM 201 can provide the indication before, during, or after the port reallocation is performed. It should also be appreciated that VSM 201 can provide indications to any host (and/or its participants) regarding any status information associated with a communication session.

Having selected for the moment a POP in accordance with operation 610, VSM 201 in accordance with operation 612 then determines whether a minimum group of endpoints is present. In accordance with an illustrative embodiment, the minimum group corresponds to the host endpoint and at least one other endpoint (i.e., that of a non-host participant) being present for the communication session being initialized. The presence of the host had been noted in accordance with operation 604. As those who are skilled in the art will appreciate, after reading this specification, another definition of what constitutes a minimum group can be used. If a minimum group is not present, the control logic flows to operation 614. Otherwise, the control logic flows to operation 618.

In accordance with operation 614, VSM 201 places the current endpoint on hold. In some embodiments, the hold condition is referred to as putting the participant in a waiting room, for example, with music-on-hold (MOH) being played to the participant.

In accordance with operation 616, VSM 201 waits for at least another request to start the current communication session, which request will be received in accordance with operation 402.

In contrast, and in accordance with operation 618, VSM 201 has determined that the host and at least one other participant have requested the communication session. Accordingly, VSM 201 bridges the communication session using the POP that was selected as part of the last execution of operation 610 for the current communication session. VSM 201 does this by transmitting signals for connecting the communication endpoints via one or more bridging resources (e.g. MCUs, etc.) that are part of the selected POP subnetwork. In some embodiments, some or all of operation 618 is part of operation 410. At this point, in some embodiments, the POP that was last selected in accordance with operation 610 is fixed, in that no further POP is considered for the current communication session.

In accordance with an illustrative embodiment of the present disclosure, once the communication session is bridged, any requests received from additional endpoints to join the bridge (i.e., received at operation 402) are handled in accordance with the operations described herein. If the additional endpoints are bridged onto the session, they are bridged using the POP and its bridging resources (e.g., an MCU, etc.) that were fixed in accordance with operation 618.

VSM 201 can also be configured to reject or terminate i) a communication session entirely or ii) some of the session segments (i.e., individual endpoint connections). The VSM may terminate segments at a specific time in order to enforce conference end times, financial agreements, or prioritization policies. Prioritization policies can include resource contention scenarios in which some segments or conferences, or both, are terminated in order to use the resources for higher priority segments or conferences.

A non-limiting example of such rejection or termination involves utilization analysis. A particular scenario of utilization analysis involves a particular enterprise network (e.g., network 102, etc.) having more communication endpoints (e.g., endpoint 110, etc.) than bandwidth in its transmission channels (e.g., channel 122, etc.). The enterprise can have VSM 201 track the enterprise's bandwidth usage (or utilization of one or more other resources), and for particular instances such as on-net customers. For instance, if i) a customer within a given enterprise with limited bandwidth has previously scheduled a conference call and ii) an on-demand conference call that will involve another endpoint within the same enterprise will otherwise occur at the same time, VSM 201 can reject the on-demand call to ensure that the enterprise will not suffer a drop in call quality for the scheduled call.

In a related action, the enterprise can set a policy in VSM 201 that scheduled conferences take priority over non-scheduled conferences, in the event of bandwidth contention. VSM 201 proactively realizes that there will be contention at a certain time (e.g., 5 pm, etc.) due to the start of a scheduled conference at that time. VSM 201 then executes a policy that starts to play an audio or video message for the participants in the non-scheduled conference, informing them that their conference will be terminated at 5 p.m. due to the contention and the policy.

Similarly, VSM 201 can reject one or more new scheduled conferences or one or more new on-demand conferences on account of one or more existing conference calls being underway. VSM 201 rejects these conferences based on the VSM's monitoring of the enterprise's bandwidth usage, either on an endpoint-by-endpoint basis or in aggregate, or both. Furthermore, the VSM can monitor transmission channels associated with any number of enterprise networks.

VSM 201 can invoke utilization analysis as part of operation 610, as part of operation 618, or as part of one or more other operations disclosed herein. For example, utilization analysis being invoked as part of operation 610 might result in a POP being selected that is possibly not the best POP from a QoS perspective based on geography, but which has transmission channels terminating into it that have ample capacity. As another example, when a best-QoS rule based on geography is strictly enforced in terms of POP selection, utilization analysis being invoked as part of operation 610 might result in on-demand calls being rejected that would otherwise use the transmission channels terminating into the selected POP.

It is to be understood that the disclosure teaches just one example of an illustrative embodiment and that many variations of the invention can easily be devised by those skilled in the art after reading this disclosure and that the scope of the present invention is to be determined by the following claims.

What is claimed is:

1. A method comprising:
  receiving, by a video session manager, requests from at least two communication endpoints to start a video communication session in which multiple communication endpoints are to participate;
  evaluating, by the video session manager, a plurality of bridging resources during initialization of the session, to select a bridging resource in the plurality for use in the video communication session, based on geographic locations of the bridging resources with respect to the geographic locations of at least one of the communication endpoints from which the requests have been received thus far during the initialization; and connecting, by the video session manager, the at least two communication endpoints via a selected bridging resource in the plurality, wherein the connecting is based on predetermined commencement criteria having been met, wherein the commencement criteria is related to the at least two communication endpoints and is based on requests having been received from at least i) a host endpoint of the video communication session and ii) at least one endpoint other than the host endpoint.

2. The method of claim 1 wherein the selected bridging resource used for the connecting is the last bridging resource selected during the initialization, and wherein at least one other bridging resource had been previously selected during the initialization, for use in the video communication session.

3. The method of claim 1 wherein the evaluating is further based on geographic proximity of at least one of the bridging resources in the plurality to the at least one of the communication endpoints from which the requests have been received.

4. The method of claim 1 wherein the evaluating is further based on a point-of-presence subnetwork providing access to services for one or more enterprise networks that comprise the greatest number of communication endpoints from which the requests have been received.

5. The method of claim 4 wherein the communication endpoints from which the requests have been received comprise a host endpoint of the video communication session, and wherein the evaluating is further based on a point-of-presence subnetwork providing access to services for one or more enterprise networks that comprise the host endpoint.

6. The method of claim 1 further comprising evaluating, by the video session manager, utilization of a transmission channel between i) an enterprise network comprising at least one endpoint and ii) a point-of-presence subnetwork comprising the selected bridging resource, wherein the connecting via the selected bridging resource is based on the evaluation of the utilization of the transmission channel.

7. A video session manager comprising:
a receiver configured to receive requests from at least two communication endpoints to start a video communication session in which multiple communication endpoints are to participate;
a processor configured to evaluate a plurality of bridging resources during initialization of the session, to select a bridging resource in the plurality for use in the video communication session, based on geographic locations of the bridging resources with respect to the geographic locations of at least one of the communication endpoints from which the requests have been received thus far during the initialization; and
a transmitter configured to transmit signals for connecting the at least two communication endpoints via a selected bridging resource in the plurality and based on predetermined commencement criteria having been met, wherein the commencement criteria is related to the at least two communication endpoints and is based on requests having been received from at least i) a host endpoint of the video communication session and ii) at least one endpoint other than the host endpoint.

8. The video session manager of claim 7 wherein the selected bridging resource used for the connecting is the last bridging resource selected during the initialization, and wherein the processor is further configured to have previously selected at least one other bridging resource during the initialization, for use in the video communication session.

9. The video session manager of claim 7 wherein the processor is further configured to evaluate based on geographic proximity of at least one of the bridging resources in the plurality to the at least one of the communication endpoints from which the requests have been received.

10. The video session manager of claim 7 wherein the processor is further configured to evaluate based on a point-of-presence subnetwork providing access to services for one or more enterprise networks that comprise the greatest number of communication endpoints from which the requests have been received.

11. The video session manager of claim 10 wherein the communication endpoints from which the requests have been received comprise a host endpoint of the video communication session, and wherein the processor is further configured to evaluate based on a point-of-presence subnetwork providing access to services for one or more enterprise networks that comprise the host endpoint.

12. The video session manager of claim 7 wherein the processor is further configured to evaluate utilization of a transmission channel between i) an enterprise network comprising at least one endpoint and ii) a point-of-presence subnetwork comprising the selected bridging resource, wherein the transmitter is further configured to transmit the signals, based on evaluation of the utilization of the transmission channel.

13. A method comprising:
receiving, by a video session manager, requests from at least two communication endpoints to start a video communication session in which multiple communication endpoints are to participate;
evaluating, by the video session manager, a plurality of bridging resources during initialization of the session, to select a bridging resource in the plurality for use in the video communication session, based on geographic locations of the bridging resources; and
connecting, by the video session manager, the at least two communication endpoints via a selected bridging resource in the plurality, wherein the selected bridging resource used for the connecting is the last bridging resource selected during the initialization, and wherein at least one other bridging resource had been previously selected during the initialization, for use in the video communication session.

14. The method of claim 13 wherein the evaluating is further based on geographic proximity of at least one of the bridging resources in the plurality to at least one of the communication endpoints from which the requests have been received.

15. The method of claim 13 wherein the evaluating is further based on a point-of-presence subnetwork providing access to services for one or more enterprise networks that comprise the greatest number of communication endpoints from which the requests have been received.

16. The method of claim 15 wherein the communication endpoints from which the requests have been received comprise a host endpoint of the video communication session, and wherein the evaluating is further based on a point-of-presence subnetwork providing access to services for one or more enterprise networks that comprise the host endpoint.

* * * * *